United States Patent [19]

Blaisdell et al.

[11] 4,388,679

[45] Jun. 14, 1983

[54] PROJECTION LIGHTING UNIT WITH GLASS REFLECTOR CAPABLE OF DUAL INSERTION

[75] Inventors: Ronald G. Blaisdell, Saugus; Harold L. Hough, Beverly, both of Mass.

[73] Assignee: GTE Products Corporation, Stamford, Conn.

[21] Appl. No.: 237,208

[22] Filed: Feb. 23, 1981

[51] Int. Cl.³ .................. F21V 7/00; F21V 17/06; F21V 21/00; G03B 15/02
[52] U.S. Cl. .................................. 362/306; 362/3; 362/350; 362/396; 362/433
[58] Field of Search .............. 362/226, 296, 306, 370, 362/396, 445, 433, 350; 353/87

[56] References Cited

U.S. PATENT DOCUMENTS

| | | | |
|---|---|---|---|
| 1,931,180 | 10/1933 | Creecy, Jr. | 362/396 X |
| 3,218,448 | 11/1965 | Cala | 362/226 |
| 3,314,331 | 4/1967 | Wiley | 353/20 |
| 3,502,864 | 3/1970 | Wagner | 362/306 |
| 3,515,476 | 6/1970 | Field et al. | 353/87 |
| 3,596,859 | 8/1971 | MacDonald | 362/396 X |
| 3,761,170 | 9/1973 | Genesky et al. | 353/87 |
| 3,789,212 | 1/1974 | Wagner | 362/306 |
| 4,156,901 | 5/1979 | Haraden et al. | 362/296 |
| 4,219,870 | 8/1980 | Haraden et al. | 362/226 |

Primary Examiner—Charles T. Jordan
Assistant Examiner—Ted L. Parr
Attorney, Agent, or Firm—Lawrence R. Fraley

[57] ABSTRACT

A projection lighting unit which enables dual insertion of the unit's glass reflector therein. The reflector, having a tungsten-halogen projection lamp sealed therein, can be inserted in a vertical manner (and therefore parallel to the plane of the unit's faceplate) or it can be inserted horizontally (or perpendicular to the planar faceplate). The means of grasping and retaining the reflector within the unit's lampholder assembly preferably comprises a steel wireform having two deflectable segments (or elements) which deflect outwardly when engaged by the reflector. Removal of the reflector is possible in similar but reverse fashion.

21 Claims, 5 Drawing Figures

PROJECTION LIGHTING UNIT WITH GLASS REFLECTOR CAPABLE OF DUAL INSERTION

TECHNICAL FIELD

The invention relates to projection lighting units and particularly to such units which include a lampholder assembly, and a glass reflector and projection lamp assembly removably positioned within the lampholder. Units of this variety are typically utilized in both slide and movie (e.g., 16 mm.) projectors.

BACKGROUND

Examples of presently existing projection lighting units of the type described are illustrated in the following patents:

U.S. Pat. No. 3,314,331—E. H. Wiley,
U.S. Pat. No. 3,502,864—D. M. Wagner,
U.S. Pat. No. 3,761,170—L. G. Genesky et al,
U.S. Pat. No. 3,789,212—D. M. Wagner.

As described therein, each unit includes a holder (or mount) and a reflector-lamp component insertable within the holder and capable of being removed in the event of repair or replacement. The lamp as used in such units is typically sealed within the reflector (see, e.g., 3,314,331) such that the lamp's pins may project from the rear of the reflector and be inserted within a suitable socket, which also forms part of the overall unit. The unit's holder is typically securedly positioned within the housing of the projector, in a manner such as illustrated in U.S. Pat. No. 3,761,170. To facilitate removal of the lamp and reflector component, an ejector (see, e.g., 3,502,864) is required to engage an outer surface of the reflector and force it in a vertical, upward direction whereupon the projector's operator can grasp the component and complete removal. One particular disadvantage of this procedure is that it necessitates forceful engagement of a glass component (the reflector) with a metal member (the ejector) which in turn can disfigure and even possibly fracture the glass article. To hopefully prevent this from occurring, manufacturers have substantially increased the reflector's wall thicknesses, thus necessitating use of greater quantities of raw material to produce this component.

Another disadvantage of projection units of the type described is that such units typically allow only vertical, downward insertion of the glass reflector and hereafter the aforedescribed vertical upward removal should repair or replacement be needed. Understandably, such restricted movement limits the versatility of these units as well as the corresponding projector housing design. The manner of insertion was believed required, however, to provide the essential, precisioned alignment of the reflector within the holder such that the assembled unit properly aligns with the remaining elements (e.g., film gate and projection lens) in the overall system. This latter alignment is understandably critical and must be maintained to assure optimum light output to the distant screen. In the particular examples illustrated in the foregoing patents, vertical insertion was also believed mandatory in order to assure proper grasping and retention of the reflector in the corresponding holder while assuring proper connection to the unit's socket. In most instances, the socket is firmly situated on an upstanding, rear segment of the holder (see, e.g., U.S. Pat. Nos. 3,502,864 and 3,789,212), or the rear portion of the reflector must be properly oriented within bifurcated prongs provided in this segment (see, e.g., U.S. Pat. No. 3,314,331). In either case, as stated, only downward placement and upward removal of the reflector, having the unit's lamp located therein, is possible.

It is believed, therefore, that a projection lighting unit which permits more than the aforedefined, restrictive singular means of insertion and removal of the unit's reflector (and lamp) within the unit's holder or mount device while still assuring precisioned alignment of the reflector within said holder would constitute a significant advancement in the projection art. It is also believed that a projection lighting unit possessing the additional features to be defined below will represent an even further art advancement.

DISCLOSURE OF THE INVENTION

It is a primary object of this invention to enhance the projection lighting unit art by providing a unit possessing the advantageous features cited above as well as in the following specification.

In accordance with one aspect of the invention, there is provided an improved projection lighting unit which includes a lampholder assembly, a glass reflector removably positioned within the lampholder assembly, and a projection lamp located within the reflector. The lampholder assembly includes a bracket member having a substantially planar faceplate portion with an aperture therein and a base portion extending therefrom. The lighting unit further includes means for engaging the reflector at an external surface thereof to retain the reflector in a predetermined manner of alignment within the lampholder assembly relative to the bracket member's aperture. The glass reflector having the projection lamp positioned therein is insertable and removable within the lampholder in two directions, the first being substantially parallel to the planar faceplate and the other substantially perpendicular thereto to thus provide a dual means of insertion and removal in the event that reflector and lamp replacement is desired.

In accordance with another aspect of the invention, there is provided an improved lampholder assembly for having a glass reflector removably positioned therein wherein the assembly includes a bracket having a substantially planar faceplate portion with an aperture therein and a base portion extending therefrom, and means for engaging the reflector to retain it in a predetermined manner of alignment within the lampholder assembly relative to the aperture within the bracket's planar faceplate portion. The lampholder includes a pair of deflectable members which are secured to the faceplate portion of the bracket and are each capable of occupying a first closed position and a second open position on the faceplate portion to permit the aforedefined dual insertion and removal of the glass reflector component.

BRIEF DESCRIPTION OF THE DRAWINGS

FIGS. 2 and 3 represent the two different means of insertion and removal of the invention's glass reflector within the invention's lampholder assembly, FIG. 2 being a side elevational view illustrating vertical insertion (parallel to the invention's faceplate) while FIG. 3 is a top view illustrating horizontal insertion (perpendicular to the faceplate);

BEST MODE FOR CARRYING OUT THE INVENTION

For a better understanding of the present invention together with other and further objects, advantages and capabilities thereof, reference is made to the following disclosure and appended claims in connection with the above-described drawing.

Figure 1:
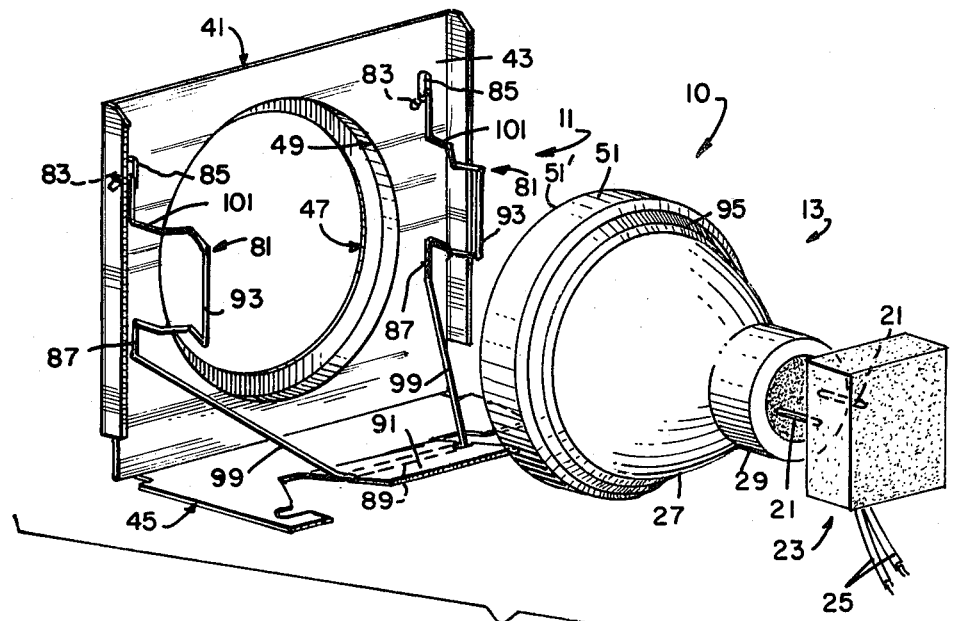
FIG. 1 is an exploded perspective view of a projection lighting unit in accordance with a preferred embodiment of the invention.

With particular reference to the drawings, there is illustrated in FIG. 1 a projection lighting unit 10 in accordance with a preferred embodiment of the invention. Unit 10 includes a lampholder assembly 11, a glass reflector 13 removably positioned within lampholder assembly 11, and a projection lamp 15 (FIG. 3) securedly positioned within the glass reflector. A preferred lamp 15 for use in unit 10 is one of the tungsten-halogen variety listed under ANSI Code ELH, and produced and sold by the assignee of the invention. This lamp typically produces 300 watts, is operable at normal line voltages, and possesses an average life of 35 hours. Within the envelope portion 17 of the lamp is located a CC8 tungsten filament structure 19 which is electrically connected within the lamp's press sealed end (not shown) to a pair of conductor pins 21 (FIG. 1) which in turn project from the rear of reflector 13. Tungsten-halogen lamp 15 is thus activated when pins 21 are electrically connected to a socket component 23 which in accordance with the teachings of the invention can be readily positioned on and in electrical contact with pins 21, and also easily removed therefrom. As such, socket 23 preferably constitutes part of the proposed present invention. It is thus understood that activation of unit 10 is accomplished when the wiring 25 of socket 23 is electrically connected to the circuitry (not shown) of the projector (also not shown) in which the invention is located and its power source placed in operation. Other lamps suitable for use in unit 10 include those listed under ANSI Code ENH and ENX, said lamps also produced and sold by the assignee of this invention. ENH lamps operate at normal line voltages and are capable of producing 250 watts over an average life of about 175 hours. ENX lamps produce 360 watts, typically operate at 82 volts, and are rated as having an average life of approximately 75 hours. Both ENH and ENX type lamps utilize a CC8 filament structure therein. Still other lamps for use in unit 10 include those producing from between 150 and 250 watts and operational at a relatively low voltage range of between 21 and 24 volts. Lamps of this type typically use C6 or CC6 filament structures and have an average operating life of between 25 and 100 hours. These latter lamps are listed under such ANSI Code designations as EJA, EJM, EJN, EJL, and ELC. The conductor pins 21 are preferably of a sound electrically conductive material such as molybdenum or a similar metal.

Reflector 13 is comprised of glass material, and preferably a hardglass such as borosilicate. The reflector includes a forward reflecting portion 27 (see especially FIG. 4), and a rear collar portion 29 adjacent the forward portion 27. Forward reflecting portion 27 is concave, and more particularly, includes either an elliptical or parabolic internal reflective surface 31 for directing the light output from lamp 15 in a forward direction "F" (FIG. 3) when unit 10 is in operation. Surface 31 may also include a dichroic mirror coating (not shown) in order to permit much of the heat generated by lamp 15 to pass therethrough while still directing the lamp's visible light output in the described forward direction. Dichroic coatings are known in the art and are typically able to withstand temperatures approaching 500° Celsius with no resultant shift in characteristics.

Lamp 15 is located within reflector 13 such that its envelope portion extends within the concave reflecting portion 27 in order that the filament 19 will be strategically positioned with regard to the reflector's focal point "$f_1$" such that it lies thereat. The lamp's sealed end portion is thus securely positioned within the narrower collar portion 29 of reflector 13, preferably using a suitable bonding cement (e.g., sauereisen). Lamp 15 is aligned and securely positioned in this manner within reflector 13 to thus provide a completely assembled component. Although there has been described in the context of the invention use of a permanently bonded lamp and reflector component, it is also within the scope of the invention to utilize a reflector and lamp assembly wherein the lamp is capable of being readily removed from the reflector either through its rear collar portion or from the front thereof either before or after reflector insertion within lampholder assembly 11. The invention is thus not meant to be restricted to a bonded lamp-reflector assembly. Suitable examples of various separable reflector and lamp components for use within projection systems are described and illustrated in U.S. Pat. Nos. 4,156,901 (Haraden et al) and 4,219,870 (Haraden et al) both of which are assigned to the same assignee as the instant invention.

As stated, alignment of reflector 13 (and therefore lamp 15) within the lampholder assembly 11 is deemed critical in order that the completed unit will properly align with the added components in the system (such as the projector's film gate and projection lens) to provide optimum light output on the screen used in such systems and located distant therefrom. More specifically, it is deemed essential that the optical axis OA—OA of the reflector 13 coincide with the axis (not shown) of the projector in which unit 10 will be located and that the focal point "$f_1$" of the reflector (and the corresponding filament structure aligned therewith) be accurately located at a precise distance from the aforementioned projector components. The instant invention as defined herein not only assures that the aforedefined alignment will be propery achieved and maintained but also that reflector 13 can be readily inserted and removed from within lampholder assembly 11 in a manner heretofore unknown in the prior art.

To accomplish the above, the lampholder assembly 11 of the present invention comprises a metal bracket member 41 which in turn includes a substantially planar faceplate portion 43 and a base or foot portion 45 which extends from faceplate portion 43 and is preferably substantially perpendicular thereto. Located within the center of the planar faceplate portion 43 is an annular aperture 47 through which the light from lamp 15 will pass. Understandably, bracket 41 is designed for being securely positioned within the corresponding projector. Specifically, base portion 45 is preferably secured to a corresponding base plate in the projector such as in the manner described in U.S. Pat. No. 3,761,170. Accordingly, openings can be provided in base portion 45 through which screws or similar mounting components can be inserted to assure adequate retention of this component in its desired location.

Figures 2, 3:
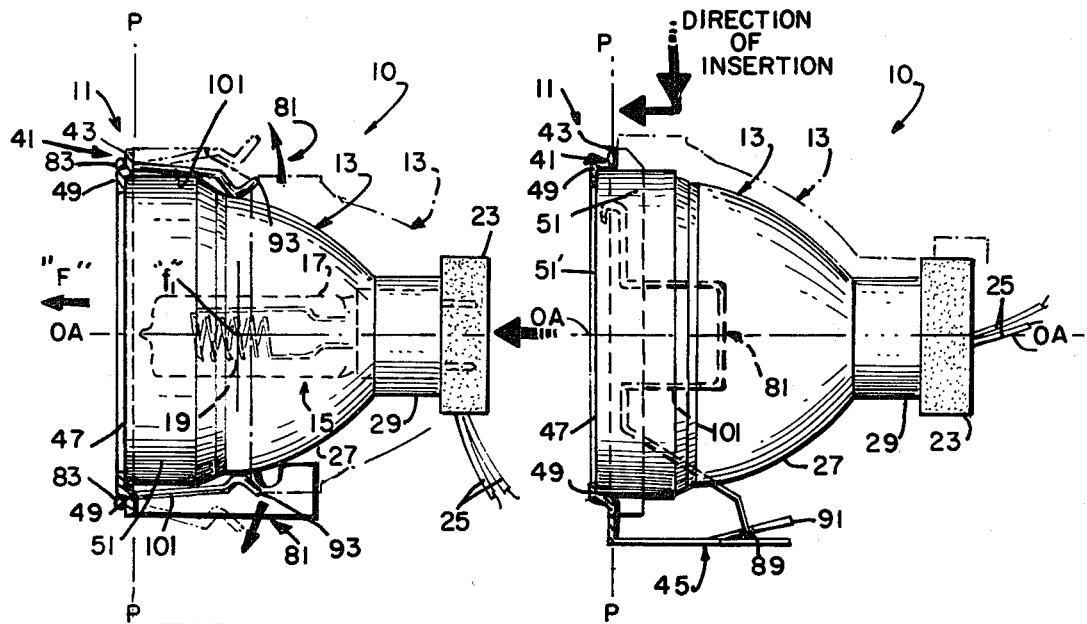

Aperture 47 is defined by a shoulder portion 49 which, as shown in FIGS. 2 and 3, projects slightly forward of the plane P—P of faceplate 43. As such, reflector 13, when finally positioned within lampholder assembly 11, has the extreme forward end portion thereof aligned and seated within shoulder 49. This extreme forward portion of the reflector is referenced by the numeral 51 in FIG. 1 and is also of substantially annular configuration, as is the internal forward opening 53 (FIG. 4) of reflector 13. Understandably, it is essential that the forward opening 53 of reflector 13 align with aperture 47 such that the optical axis OA—OA thereof will coincide with the projection axis in the manner defined. Accordingly, bracket assembly 11 is mounted within the projector such that the projector's projection axis passes through the center of aperture 47.

Figure 4:
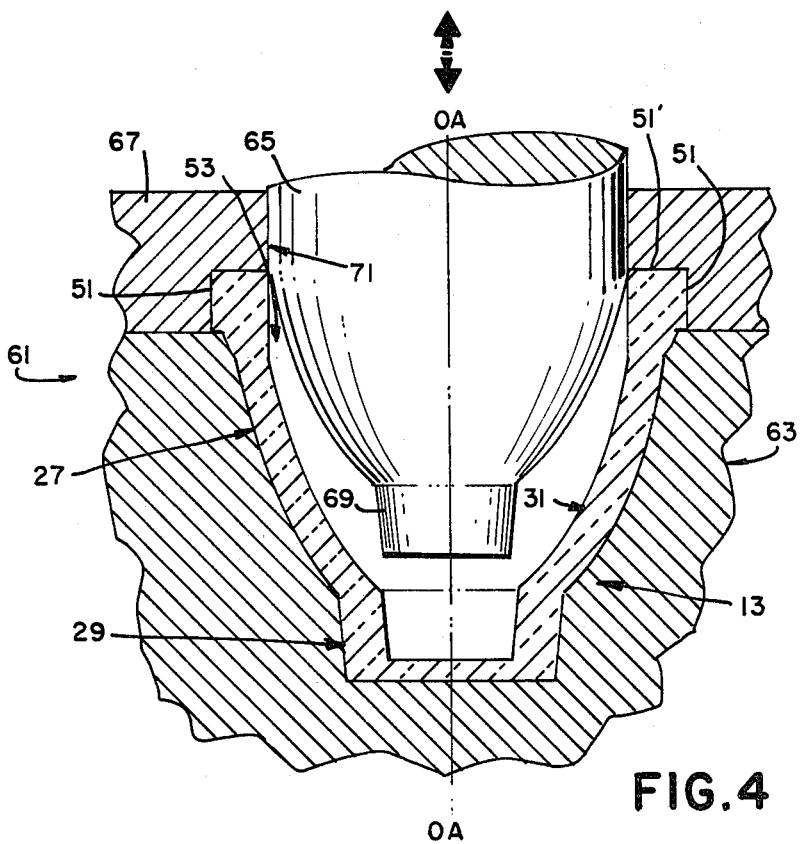
FIG. 4 illustrates various components of the lamp-making equipment as utilized to produce the glass reflector of the invention.

The instant invention represents a unique concept in assuring the aforementioned precise alignment between the reflector and bracket components while still engaging an external forward surface (51) of the reflector. Specifically, many problems existed in prior art techniques wherein the reflector was maintained by retention of an outer flange portion thereof in view of the ready possibility that such an external surface would not always lie true with respect to the reflector's centrally located optical axis. With reference to FIG. 4, an example of how this might occur can be seen. A glass reflector such as reflector 13 is formed within a suitable mold member 61 which in turn includes a female portion 63 designed to have a predetermined quantity of molten glass deposited therein, said glass eventually to constitute the finished reflector. A plunger 65 is designed to pass through a neckring portion 67 of the mold and engage the molten glass within the mold's female portion 63 to define its final internal configuration. Understandably, female portion 63 serves to define the reflector's external configuration. In such equipment, it is occasionally possible for misalignment to occur between the separate neckring and female mold portions as a result of lateral movement therebetween during the manufacturing process. Notwithstanding such movement however, plunger 65, being of substantially cylindrical configuration and having the forward defining segment 69, maintains precisioned alignment within the corresponding cylindrical aperture 71 located within the neckring and thus remains substantially true with regard thereto by virtue of maintenance of close tolerances between such components. Accordingly, should a shifting or similar misalignment occur between the female and neckring portions of the mold, a resulting differential in thickness in the reflector's side walls can occur. To adjust for this, and thus assure that the forward external surface 51 remains true relative to the central finished reflector's optical axis OA—OA, the extreme forward portion of reflector 13 which includes surface 51 is formed within the neckring 67. Accordingly, should a shift occur between neck ring and female portions 67 and 63 respectively, the external surface 51 in the finished product will remain true in spite of a corresponding differential in reflector wall thickness in the finished product. This procedure is thus vastly different from known techniques wherein the reflector was formed totally within the female portion of the mold. After the molten glass has been allowed to cool to a predetermined temperature, the plunger and neckring members of the mold are separated from the female portion, and the glass reflector thereafter removed. The reflector is then subjected to some minor glass machining procedures, such as removal of the extreme end (rear) portion thereof (e.g., by grinding) so as to provide an open rear portion 29. Reflector 13 is also subjected to polishing and other steps, including deposition of the aforementioned dichoric coating, if desired.

As stated, one of the key features of the present invention is the ability of the lampholder assembly 11 to permit reflector 13 to be inserted therein and removed therefrom in more than a singular, vertical direction such as was provided in projection lighting units described in the aforementioned U.S. patents. Specifically, lampholder assembly 11 allows for reflector 13 to be inserted in a direction substantially parallel to the plane P—P of the forward faceplate portion 43 of bracket member 41 (see FIG. 2) or for the reflector to be inserted in a direction substantially perpendicular to the planar faceplate 43 (see FIG. 3). Understandably, such dual means of insertion increases the versatility of the invention while also expanding the design possibilities for the corresponding projector in which the invention will be located. This unique means of insertion is accomplished by providing a pair of movable engagement members 81 which are positioned on faceplate portion 43 of bracket 41 on opposing sides of the centrally positioned aperture 47. Each member 81 is designed for assuming a first, closed position such as illustrated in solid in FIG. 3 and thereafter being deflected to a second open position (shown in phantom in FIG. 3) when engaged by the forward edge portion 51 of reflector 13.

In a preferred embodiment, each deflectable member 81 is preferably a wireform element which forms part of a single wireform member secured to bracket 41 in the manner illustrated in FIG. 1. Accordingly, each wireform element is secured to the faceplate portion 43 by clamping a hooked end portion 83 thereof within a corresponding opening 85 provided in the faceplate. Each element 81 also further includes a foot segment 87 which securely rests against the internal surface of faceplate 43 and is joined to a transverse, interconnecting element 89 which is clamped about an angularly projecting section 91 of base 45. Angular section 91 preferably forms an angle of about 30° with the remaining (or first section) part of base 45. It is important to note that the upwardly extending second section 91 projects only slightly above the plane of the remaining part of base 45 and therefore does not interfere with the outermost forward surface 51 of reflector 13 during the aforedescribed perpendicular insertion.

It is thus seen that the deflectable members 81 form part of a singular wireform member which is securedly positioned on bracket 41 in at least three locations and, in accordance with the invention as depicted in FIG. 1, also firmly rests against a surface of the bracket at two additional locations. When reflector 13 is inserted in the manner shown in FIG. 3, the forward surface 51 thereof engages a corresponding forward angular engaging section 93 of each member 81, forcing this member to move as indicated. In a preferred embodiment, each angular section 93 forms an angle of approximately 45° with the direction of insertion (and therefore outer, forward edge 51) of reflector 13. Once the forward surface 51 passes the angular initial engaging section 93 and becomes fully positioned within shoulder 49, each deflectable member 81 is designed to return to its substantially first, closed position and thus firmly clamp the reflector by engaging an outer surface of forward portion 27, said surface shown in the drawings as being located behind forward surface 51. It can thus be seen that during the aforementioned manner of insertion of reflector 13, the only portions of the singular wireform member of the invention which engage the reflector are those which are designed to deflect in the manner indicated. At no time does the reflector engage any other part of the lampholder assembly, until finally being positioned within the annular shoulder 49 of faceplate 43. To assure this nonengagement, the connecting leg segments 99 of the wireform member are designed to remain clear of the reflector's outer surface 51. Once reflector 13 has been firmly positioned within the lampholder assembly 11, socket 23 is thereafter attached in the manner indicated and unit 10 is ready for operation. Should removal be necessary (e.g., to repair lampholder assembly 11 or replace the projector and lamp components), the projector operator has only to remove the separate socket component 23 and thereafter grasp the neck or collar portion 29 of the reflector and pull in a direction away from and perpendicular to the faceplate 43. The tension in each wireform deflectable element 81 is such so as to permit ready removal should it be necessary.

In FIG. 2, reflector 13 is illustrated as being inserted in a substantially vertical direction and therefore parallel to the plane P—P occupied by faceplate 43. Specifically, the forward edge (51') of region 51 of reflector 13 is designed to engage and slide along the planar upper portion of faceplate 43 and thereafter engage (at opposing surfaces thereof) a recessed segment or portion 101 of each wireform engaging member 81 to in turn cause member 81 to deflect to the aforedescribed open position and thus enable further downward parallel insertion of the reflector until final positioning within shoulder 49. The position of the reflector immediately prior to said final positioning is shown in phantom in FIG. 2. Accordingly, the forward outer, forward surface 51 of reflector 13 does not engage the outermost angular segments 93 of the wireform members, but instead only engages (on opposing surfaces thereof) each of the aforedescribed recessed portions or segments 101. Once final positioning of the reflector has occurred, socket 23 can be attached in the manner described. It should also be noted that in both of the aforedescribed methods of insertion, socket 23 can be attached to the pins 21 projecting from the reflector prior to its insertion.

The recessed segments 101 of each deflectable member 81 are designed to accommodate the outer reference surface 51 in the manner illustrated. It can thus be seen in FIG. 3 that each recessed segment need not engage and therefore provide an interference fit with the outermost surface 51 to achieve retention of the reflector in lampholder assembly 11. It is only necessary with regard to the instant invention that the curved, angular section 93 engage the illustrated outer surface in the manner shown on opposing sides of the reflector in order to provide the desired, positive retention thereof. It is also understood with regard to the embodiment of the invention as depicted in FIG. 3 that the forward engaging segments 93 of the wireform member of the invention engage opposing sides of the reflector 13 to provide a four-point contact, each forward segment 93 having two knee portions for engaging the reflector's outer surface.

Substantially vertical (upward) removal of reflector 13 from the lampholder assembly 11 in FIG. 2 is possible by the projector operator merely grasping the reflector 13 at the collar or neck portion 29 and thereafter pulling upwardly. Again, the spring tension of the wireform elements 81 will permit ready removal in this manner.

Figure 5:
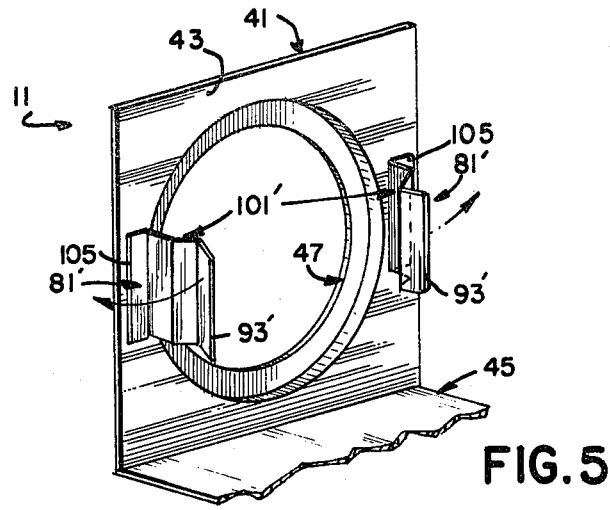
FIG. 5 is a partial perspective view of a bracket and pair of deflectable retention members for use in the invention.

In FIG. 5 there is shown a pair of deflectable members 81' in accordance with an alternate embodiment of the invention. Each member 81' is preferably a substantially solid, metallic leaf spring having a multiplanar configuration so as to inclue a forward angular engaging surface or section 93' substantially similar in operation to that of the corresponding segment for the wireform members shown in FIG. 1. In addition, each leaf spring 81' also preferably includes a recessed portion 101' which functions in similar manner to portions 101 in FIG. 1. Each multiplanar leaf spring is preferably comprised of 0.020 inch thick stainless steel (e.g., AISI No. 301) and is secured to the steel faceplate 43 (e.g., at a provided foot portion 105) by welding. Each member 81' thus functions similarly to the corresponding members 81 in FIG. 1 to provide for both vertical and horizontal (parallel and perpendicular, respectively) insertion of the glass reflector component. As such, each leaf spring 81' is designed to occupy a first closed position and thereafter be deflected to the open, second position in the same manner as that described for the embodiment of FIG. 1. In addition, each spring 81' is also adapted for thereafter substantially returning to the closed (retaining) position when the reflector is fully inserted and its forward outermost surface (flange) 51 firmly seated in shoulder 49.

The preferred metal for bracket 41, as stated, is steel and preferably No. 20 gauge nickel plated cold rolled stainless steel having a thickness of 0.0359 inches. The preferred material for the wireform member of the invention is 0.037 inch diameter stainless steel music wire. The outer housing for socket 23 is preferably ceramic and includes therein a plurality of metal (e.g., brass) contacts which are each designed for effecting electrical contact with a corresponding pin 21. Each brass contact is in turn electrically connected to a respective one of the wires 25 emitting from the socket's ceramic housing. The remaining materials for the invention have been described.

There has thus been shown and described a projection lighting unit which permits dual insertion of the unit's glass reflector and lamp components within the unit's lampholder assembly while still maintaining positive, precisioned alignment therebetween. This dual insertion, as well as similar removal, is possible without the added requirement of a releasing-type mechanism as heretofore required in projection units such as described in the aforementioned patents. It is thus not necessary for the projector's operator to manipulate such a release mechanism in order to achieve removal. It is thus also not essential for the glass reflector to be engaged by a metallic release mechanism which in turn can cause disfigurement or even fracture thereof should excessive force be applied.

While there have been shown and described what are at present considered the preferred embodiments of the invention, it will be obvious to those skilled in the art that various changes and modifications may be made therein without departing from the scope of the invention as defined by the appended claims.

What is claimed is:

1. In a projection lighting unit including a lampholder assembly, a glass reflector removably positioned within said lampholder assembly and including a forward, concave reflecting portion and a rear neck portion, and a projection lamp positioned within said glass reflector, said lampholder assembly including a bracket member having a substantially planar faceplate portion with an aperture therein and a base portion extending therefrom and means for engaging said glass reflector at an external surface thereof to retain said reflector in a predetermined manner of alignment within said lampholder assembly relative to said aperture within said substantially planar faceplate portion of said bracket, the improvement wherein said means for engaging said glass reflector at an external surface thereof to retain said reflector within said lampholder assembly in said predetermined manner of alignment comprises a pair of deflectable engagement members secured to said faceplate portion of said bracket member on opposing sides of said aperture, each of said engagement members occupying a first, closed position prior to insertion of said glass reflector having said projection lamp therein within said lampholder assembly and deflecting to a second, open position during said insertion such that said glass reflector is insertable and removable within said lampholder in two directions, the first of said directions being substantially parallel to said substantially planar faceplate portion of said bracket, and the second of said directions being substantially perpendicular to said substantially planar faceplate portion, said deflectable engagement members substantially returning to said first, closed position when said glass reflector is fully positioned within said lampholder assembly.

2. The improvement according to claim 1 wherein each of said engagement members is capable of deflecting to said second open position during removal of said reflector.

3. The improvement according to claim 1 wherein each of said engagement members comprises a substantially solid leaf spring having an angular, forward engaging section for initially engaging said external surface of said reflector along substantially opposite sides of said forward reflecting portion during insertion of said reflector in said substantially perpendicular direction.

4. The improvement according to claim 3 wherein each of said leaf springs includes a recessed section substantially adjacent said forward engaging section, said recessed section initially engaging said external surface of said glass reflector along substantially opposite sides of said forward reflecting portion during insertion of said reflector in said substantially parallel direction.

5. The improvement according to claim 1 wherein each of said engagement members comprises a wireform element having an angular forward engaging segment for initially engaging said external surface of said glass reflector along substantially opposite sides of said forward reflecting portion during insertion of said reflector in said substantially perpendicular direction.

6. The improvement according to claim 5 wherein each of said wireform elements includes at least one recessed segment substantially adjacent said forward engaging segment, said recessed segment initially engaging said external surface of said glass reflector along substantially opposite sides of said forward reflecting portion during insertion of said reflector in said substantially parallel direction.

7. The improvement according to claim 6 wherein each of said wireform elements forms part of a single wireform member, said wireform member further including a transverse element interconnecting said wireform elements.

8. The improvement according to claim 7 wherein said interconnecting transverse element of said wireform member is secured about said base portion of said bracket member.

9. The improvement according to claim 8 wherein said base portion of said bracket member includes a first section substantially perpendicular to said substantially planar faceplate portion and a second section forming an angle with said first section, said interconnecting transverse element secured about said second section.

10. The improvement according to claim 1 wherein said faceplate portion of said bracket member includes an annular shoulder portion therein, said shoulder portion defining said aperture within said faceplate portion, said forward reflecting portion of said glass reflector including an annular flange thereabout, said annular flange being positioned within and in contact with said shoulder portion when said glass reflector is fully inserted within said lampholder assembly.

11. The improvement according to claim 1 wherein said projection lamp positioned within said glass reflector includes a pair of conductor pins projecting from said rear neck portion of said glass reflector, said projection lamp unit further including a socket member located on and in electrical contact with said conductor pins, said socket member not secured to or forming part of said bracket member.

12. In a projection lighting unit lampholder assembly for having a glass reflector removably positioned therein wherein said lampholder assembly includes a bracket member having a substantially planar faceplate portion with an aperture therein and a base portion extending therefrom, and means for engaging said glass reflector at an external surface thereof to retain said reflector in a predetermined manner of alignment within said lampholder assembly relative to said aperture within said substantially planar faceplate portion, the improvement wherein said means for engaging and retaining said glass reflector comprises:

first and second deflectable members secured to said faceplate portion of said bracket member, each of said deflectable members adapted for occupying a first closed position prior to insertion of said glass reflector and a second, open position on said faceplate portion during said insertion to permit said glass reflector to be inserted within and removed from said lampholder assembly in two directions, the first of said directions being substantially parallel to said substantially planar faceplate portion of said bracket, and the second of said directions being substantially perpendicular to said substantially planar faceplate portion, each of said deflectable members adapted for returning to said first, closed position when said glass reflector is fully inserted within said lampholder assembly and is thereafter capable of deflecting to said second, open position during removal of said reflector.

13. The improvement according to claim 12 wherein said deflectable members are secured to said faceplate portion of said bracket member on opposite sides of said aperture.

14. The improvement according to claim 12 wherein said glass reflector includes a forward reflecting portion, each of said deflectable members comprising a substantially solid leaf spring having an angular, forward engaging section for intially engaging said external surface of said glass reflector on substantially opposite sides of said forward reflecting portion during insertion of said reflector in said substantially perpendicular direction.

15. The improvement according to claim 14 wherein each of said leaf springs includes a recessed section substantially adjacent said forward engaging section, said recessed section adapted for initially engaging said external surface of said glass reflector along substantially opposite sides of said forward reflecting portion during insertion of said reflector in said substantially parallel direction.

16. The improvement according to claim 12 wherein said glass reflector includes a forward, reflecting portion, each of said deflectable members comprising a wireform element having an angular forward engaging segment for initially engaging said external surface of said glass reflector along substantially opposite sides of said forward reflecting portion during insertion of said reflector in said substantially perpendicular direction.

17. The improvement according to claim 16 wherein each of said wireform elements includes at least one recessed segment substantially adjacent said forward engaging segment, said recessed segment initially engaging said external surface of said glass reflector along substantially opposite sides of said forward reflecting portion during insertion of said reflector in said substantially parallel direction.

18. The improvement according to claim 17 wherein each of said wireform elements forms part of a single wireform member, said wireform member further including a transverse element interconnecting said wireform elements.

19. The improvement according to claim 18 wherein said interconnecting transverse element of said wireform member is secured about said base portion of said bracket member.

20. The improvement according to claim 19 wherein said base portion of said bracket member includes a first section substantially perpendicular to said substantially planar faceplate portion and a second section forming an angle with said first section, said interconnecting transverse element secured about said second section.

21. The improvement according to claim 12 wherein said faceplate portion of said bracket member includes an annular shoulder portion therein, said shoulder portion defining said aperture within said faceplate portion, said glass reflector including a forward reflecting portion having an annular flange thereabout for being positioned within and in contact with said shoulder portion when said glass reflector is fully inserted within said lampholder assembly.

* * * * *